United States Patent [19]

Endo et al.

[11] 4,446,115

[45] May 1, 1984

[54] METHOD OF RECOVERING TANTALUM FROM SILICON-CONTAINING TANTALUM SCRAP

[75] Inventors: Hiroshi Endo; Naoyuki Hirate; Masao Tezuka, all of Yokohama, Japan

[73] Assignee: Tokyo Shibaura Denki Kabushiki Kaisha, Kawasaki, Japan

[21] Appl. No.: 353,826

[22] Filed: Mar. 2, 1982

Related U.S. Application Data

[63] Continuation-in-part of Ser. No. 235,114, Feb. 17, 1981, abandoned.

[30] Foreign Application Priority Data

Feb. 15, 1980 [JP] Japan .................................. 55-16642

[51] Int. Cl.$^3$ ............................................. C01G 35/00
[52] U.S. Cl. ......................................... 423/63; 423/66; 75/101 BE
[58] Field of Search ........................... 423/63, 101 BE

[56] References Cited

U.S. PATENT DOCUMENTS 2,937,072  5/1960  McLean ................................ 423/63

OTHER PUBLICATIONS

Hague et al., "J. of Research, Bureau of Standards", vol. 62, 1959, pp. 11-19.
Bergstresser, "Analytical Chem.", vol. 31, 1959, pp. 1812-1814.
Kraus et al., "J. American Chem. Soc.", vol. 71, 1949, p. 3855.

Primary Examiner—Herbert T. Carter
Attorney, Agent, or Firm—Schwartz, Jeffery, Schwaab, Mack, Blumenthal & Koch

[57] ABSTRACT

Disclosed is method of recovering tantalum from silicon-containing tantalum scrap, which comprises dissolving said scrap in an inorganic acid, bringing the resulting solution into contact with an anionic exchange resin, followed by washing said anionic exchange resin with (a) a solution of 3 to 10 mol/l. of hydrofluoric acid or (b) a solution of strongly acidic medium containing 0.01 to 0.5 mol/l. of hydrofluoric acid and 1 to 6 mol/l. of a strong acid, and then washing the same with an aqueous solution of a mixture composed of hydrofluoric acid, aqueous ammonia and an ammonium salt.

14 Claims, 1 Drawing Figure

METHOD OF RECOVERING TANTALUM FROM SILICON-CONTAINING TANTALUM SCRAP

CROSS-REFERENCE TO RELATED APPLICATION

This application is a continuation-in-part of our application Ser. No. 235,114 filed Feb. 17, 1981 now abandoned.

BACKGROUND OF THE INVENTION

This invention relates to a method of recovering tantalum of high purity from silicon-containing tantalum scrap.

In the production of single crystalline lithium tantalate which is useful for the material to constitute surface acoustic wave filter element, there has been increasing demand for tantalum pentoxide of high purity for the purpose of enhancing the yield of the same. It has been accordingly practiced to recover the tantalum from tantalum-containing scrap such as melts in crucible which are formed at the time when single crystalline lithium tantalate is produced, wafer cuttings produced at the time of the processing of single crystalline lithium tantalate, scrap from wafer grinding, and scrap from tantalum capacitor.

Tantalum-containing scrap generally includes as impurities silicon, iron, copper, aluminium, niobium, calcium and so on. As the method for recovering tantalum from such tantalum-containing scrap, the following extraction method and distillation method are known in general:

In the extraction method, tantalum-containing scrap is first dissolved, for example, in hydrofluoric acid, and then tantalum is extracted with methyl isobutyl ketone (MIBK).

Niobium which is extracted simultaneously therewith is removed by the back-extraction process by the use of a solution of sulfuric acid containing hydrofluoric acid. Thereafter, added is, for example, potassium salt such as potassium carbonate to precipitate tantalum as potassium fluorotantalate ($K_2TaF_7$). The precipitate is separated by filtration, dissolved again in hot water of about 80° C., and then hydrolized by adding aqueous ammonia thereto to obtain a precipitate of tantalum hydroxide ($Ta(OH)_5$). The thus obtained precipitate is collected by filtration and heated at higher temperature to obtain tantalum pentoxide ($Ta_2O_5$). (See Carlson, C. W. & U. R. H. Nielsen, "J. Metals", June 1960, P. 472).

This extraction method, however, is disadvantageous in that niobium can not completely be removed at the time of the back-extraction using the solution of sulfuric acid containing hydrofluoric acid; the residual niobium tends to coprecipitate as potassium fluoroniobate when the potassium salt is added; and that the purity of tantalum pentoxide thus obtained as well as the yield thereof is lowered because of the solubility of potassium fluorotantalate in the solution of sulfuric acid containing hydrofluoric acid.

The distillation method, on the other hand utilizes the difference in boiling points of chlorides obtainable when tantalum-containing scrap is mixed, for example, with carbon, followed by chlorination at about 600° to 800° C. by passing a chlorine gas. (See German Patent Nos. 1017601 and 1056105.) In this method, however, it is difficult to control the temperature at the time of fractional distillation of the chlorides because the difference of boiling points between tantalum chloride (b.p. 239° C.) and niobium chloride (b.p. 249° C.), which is 10° C., is too small from industrial viewpoints. In addition, it becomes substantially impossible to separate them if something having boiling point similar to the tantalum chloride is present, and therefore tantalum pentoxide of high purity may not be recovered.

Hague et al, "Journal of Research of the National Bureau of Standards", Vol. 62, No. 1, 1959, pp 11–19, teaches a method of separating tantalum metals by dissolving the sample in acid, contacting tantalum and other metals with an anion exchanger, eluting with a solution containing hydrofluoric acid and hydrochloric acid, and finally eluting tantalum with a solution containing ammonium salt. This publication, however, does not mention a recovery of tantalum from a scrap where the silicon, which otherwise tends to remain unremoved and contained in a tantalum eluate as impurity, is included.

SUMMARY OF THE INVENTION

As a result of intensive studies seeking a method and an apparatus which eliminates these defects in the conventional methods and recover tantalum pentoxide in a high purity and high yield from silicon-containing tantalum scrap, the present inventors have accomplished this invention.

According to the present invention, there is provided a method of recovering tantalum from silicon-containing tantalum scrap, which comprises dissolving said scrap in an inorganic acid, bringing the resultant solution into contact with an anionic exchange resin, followed by washing said anionic exchange resin with a solution of hydrofluoric acid or a strongly acidic medium containing hydrofluoric acid, and then further washing the same with an aqueous solution of a mixture composed of hydrofluoric acid, aqueous ammonia and an ammonium salt.

DETAILED DESCRIPTION OF PREFERRED EMBODIMENTS

Figure 1:
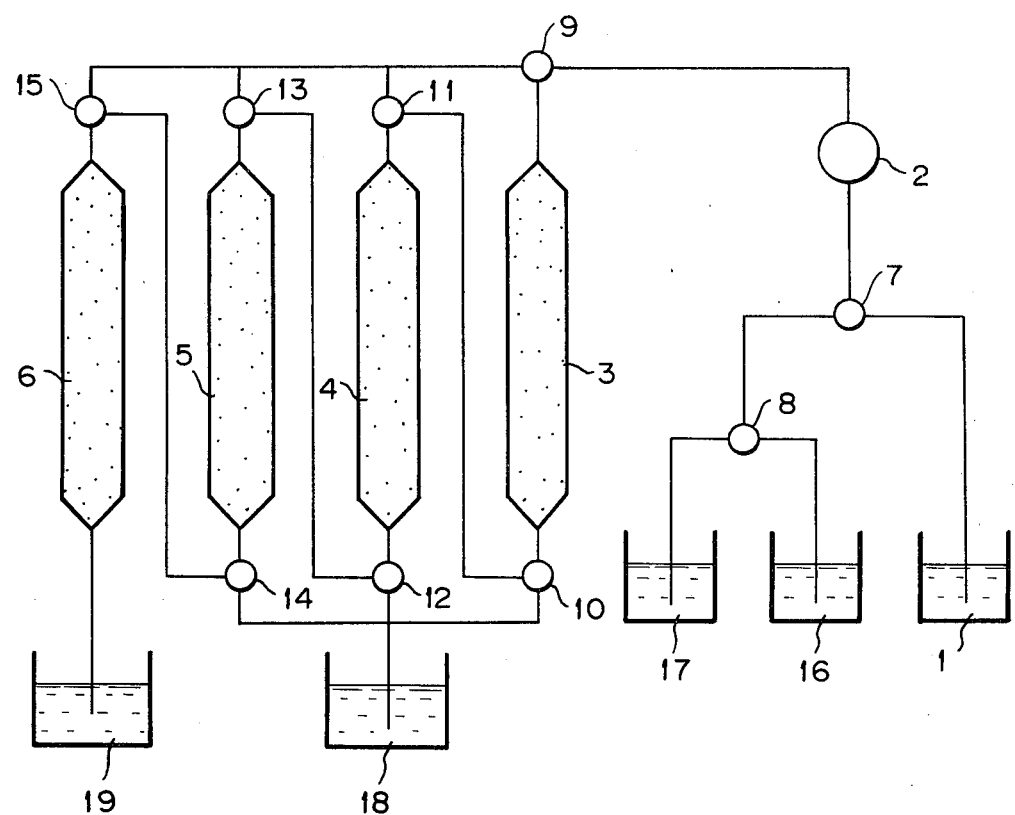

In the present invention, silicon-containing tantalaum scrap is first dissolved by using an inorganic acid such as, for example, hydrofluoric acid, hydrochloric acid, nitric acid and sulfuric acid according to the conventional manner. Then the resulting solution is brought into contact with an anionic exchange resin. As the preferred anionic exchange resin to be used, there may be mentioned for example the anionic exchange resin of strongly basic quarternary ammonium type or strongly basic piridinium type whose body material is a copolymer of styrene and divinylbenzene. Among these, it is preferable to employ an anionic exchange resin whose exchanger is strongly basic quarternary ammonium and including about 8% of divinylbenzene.

Said anionic exchange resin is then washed with an eluting solution of hydrofluoric acid or of strongly acidic medium containing hydrofluoric acid. At this time, tantalum is reacted with hydrofluoric acid to form fluoride complex anion ($TaF_7^{2-}$) and is adsorbed and fixed on the anionic exchange resin. However, the metals which are present as cations are successively eluted and removed therefrom without being adsorbed and fixed on the anionic exchange resin.

The strongly acidic medium is composed of a mixture of hydrofluoric acid and at least one strong acid selected from the group consisting of hydrochloric acid, nitric acid, sulfuric acid and perchloric acid.

Of these eluting solutions to be used for the elution and removal of the metals other than tantalum, the concentration of hydrofluoric acid in the eluting solution of hydrofluoric acid may be adjusted within the range of from 3 to 10 mol/l., and more preferably within the range of from 6 to 9 mol/l. Concentration of not more than 3 mol/l. would not allow swift elution of the metals other than tantalum and require a large amount of eluting solution or a lot of time. Concentration of more than 10 mol/l. would render the recovering operations very expensive. In the case where employed is the eluting solution of strongly acidic medium containing hydrofluoric acid, the concentration of hydrofluoric acid included therein should preferably be adjusted within the range of from 0.01 to 0.5 mol/l. and more preferably within the range of from 0.1 to 0.3 mol/l. and the concentration of the strong acid should preferably be adjusted within the range of from 1 to 6 mol/l. and more preferably within the range of from 2 to 4 mol/l.

It is important in this invention to adjust the concentration of said hydrofluoric acid and strong acid to the ranges as given above. More detailed reasons therefor will be explained later.

Following the above step, tantalum as the complex anion adsorbed and fixed on the anionic exchange resin is eluted therefrom by washing said anionic exchange resin with an aqueous solution of a mixture composed of hydrofluoric acid, aqueous ammonia and an ammonium salt.

As the ammonium salt, there may be employed at least one ammonium salt selected from the group consisting of ammonium chloride, ammonium nitrate, ammonium sulfate and ammonium perchlorate.

These tantalum-eluting solutions should preferably be adjusted to pH ranging from 3 to 6. The pH of not more than 3 would undesirably cause tailing phenomenon when tantalum is eluted, and require a large amount of eluting solution and a lot of time. The pH of more than 6 would cause the hydrolysis of tantalum complex anion to generate a phenomenon in which tantalum hydroxide is precipitated on the anionic exchange resin.

More particularly, the pH of tantalum-eluting solution should preferably be adjusted to 5.0 to 6.0 in the case of hydrofluoric acid-aqueous ammonia-ammonium chloride solution, 3.0 to 4.0 in the case of hydrofluoric acid-aqueous ammonia-ammonium nitrate solution, 2.0 to 4.0 in the case of hydrofluoric acid-aqueous ammonia-ammonium sulfate solution, and 3.0 to 5.0 in the case of hydrofluoric acid-aqueous ammonia-ammonium perchlorate solution, respectively.

Tantalum eluate thus obtained is further adjusted to pH 6.0 or more by the use of aqueous ammonia to precipitate tantalum hydroxide (Ta(OH)$_5$). The precipitate is dehydrated by heating at a higher temperature according to the conventional manner to obtain the desired tantalum pentoxide (Ta$_2$O$_5$).

The present invention which is comprised as described above has advantageous effects as follows:

(1) Tantalum can be completely separated even in case the scrap includes as impurities, a large amount of metals other than the tantalum including silicon, and therefore it is possible to recover tantalum in a high purity and high yield in the form of tantalum pentoxide.

(2) Used solutions for eluting metallic impurities and for eluting tantalum can be reused by subjecting the same to distillation treatment, treatment for controlling the concentration of acid and so on. This may lower the cost for recovering tantalum and may serve contributory countermeasure to environmental contamination.

(3) Since the principal treatment can be made by allowing several kinds of solutions to flow into and flow out of the anionic exchange resin, tantalum may be recovered by comparatively simple equipment and simple operation.

This invention will be described in more detail by the following Examples:

EXAMPLE 1

As tantalum-containing scrap, employed were cuttings produced from wafer processing of single crystalline lithium tantalate. In the cuttings, contained were 27.4% of tantalum, 15.6% of silicon, 12.0% of aluminum, 2.1% of iron, 1.0% of lithium, 0.5% of niobium (all in % by weight) and trace amounts of copper, magnesium and calcium.

1 Kg of the cuttings were incorporated into a sealable container whose inner wall is composed of copolymer of ethylene tetrafluoride, added thereto was an acidic solution of a mixture consisting of 2 l. of twenty-eight normal (28 N) hydrofluoric acid and 0.5 l. of fourteen normal (14 N) nitric acid, followed by heating at 100° C. and dissolving said cuttings to obtain a sample solution.

In preparing the eluting solution for metallic impurities, selected was hydrofluoric acid having a concentration of 8 mol/l.

Further prepared was tantalum-eluting solution by dissolving 2.4 kg of ammonium nitrate in an aqueous solution of the mixture of 5 l. of two normal (2 N) hydrofluoric acid and 5 l. of one and a half normal (1.5 N) aqueous ammonia. The pH of the solution was adjusted to 3.5.

As the anionic exchange resin, selected was a strongly basic quarternary ammonium type resin whose body material is a copolymer of styrene and divinylbenzene. (Tradename: DOWEX SRB-P; average particle size: 20 to 50 mesh; produced by Dow Chemical Co., U.S.A.). 400 g. of this anionic exchange resin was sufficiently swelled with water and packed in a column of 40 mm in diameter and 400 mm in length, made of vinyl chloride, to form an ion exchange column. A plurality of columns of this type were prepared, thereby constructing an apparatus for recovering tantalum as shown in the accompanying drawings, FIG. 1, in which reference numeral 1 designates the sample solution; 2 designates a feed solution pump; 3, 4, 5 and 6 each designate a column containing an anionic exchange resin; 7, 8, 9, 10, 11, 12, 13, 14 and 15 each designate a three-way cock for changing over the flow of the solution; 16 designates an eluting solution for metal impurities; and 17 designates a tantalum-eluting solution. Numeral 18 designates a tantalum eluate collected for a final step for recovering tantalum therefrom. Numeral 19 designates impurity eluate collected as waste solution.

The recovery of tantalum was carried out according to the following operation:

First, the three-way cocks 7, 9, 10, 11, 12, 13, 14 and 15 were opened to form a flow path through which the sample solution 1 may pass and flow successively into columns 3, 4, 5 and 6. The feed solution pump 2 was actuated to allow the sample solution 1 to pass through the flow path.

Next, the three-way cock 14 was intermittently changed over to withdraw the sample solution 1 flowing out from the column 5. The solution flowed out therefrom was then analyzed by the conventional procedure, and, upon confirmation of the presence of tantalum, the flow of the sample solution 1 was stopped.

The three-way cock 8 was opened and the three-way cock 7 was changed over to allow 2 l. of the metal impurity-eluting solution 16 to pass through the flow path. The three-way cocks 9 and 11 were then changed over to close the flow path leading to the column 3 and to allow the metal impurity-eluting solution 16 to flow into the column 4. Then the three-way cocks 11 and 13 were changed over to close the flow path leading to the column 4 and to allow 1 l. of the metal impurity-eluting solution 16 to flow into the column 5.

The three-way cocks 8, 9 and 10 were changed over to form a flow path through which the tantalum-eluting solution 17 may flow only into the column 3, and 17.2 l. of the tantalum-eluting solution 17 was allowed to pass therethrough. Next, the similar flow path was formed with respect to each of the columns 4 and 5 to allow 2 l. of the tantalum-eluting solution 17 to flow thereinto, respectively. The effluent obtained from the respective columns was collected as tantalum eluate 18. At the pretreatment of the elution of tantalum, a part of tantalum, which flowed into the column 6, was collected in the same manner as above by placing the column 6 at the position of the column 3.

To the tantalum eluate thus obtained was added fifteen normal (15 N) aqueous ammonia to adjust the pH thereof to 6.9, and the resultant precipitate was collected by filtration. The precipitate was placed in a porcelain crucible and heated at 1000° C. to obtain 328.1 g. of white powdery tantalum pentoxide. The recovery of tantalum was determined to be 98.2% according to the following equation:

$$328.1 \times 2Ta/Ta_2O_5/274 \times 100\%$$

This powdery product was subjected to a quantitative analysis by the conventional procedure to observe the quantitative values of metallic elements, except tantalum, which were contained in the cuttings. The results are shown in Table 1 presented hereinafter.

EXAMPLE 2

As tantalum-containing scrap, employed was 1 kg of tantalum capacitor scrap, in which contained were 92% of tantalum, 1.2% of silver, 1.1% of manganese, 0.1% of iron (all in % by weight) and trace amounts of silicon, copper, calcium, niobium, aluminum and magnesium. In the same manner as in Example 1, prepared was the sample solution by the use of an acidic solution of the mixture consisting of 2 l. of 28 N hydrofluoric acid and 0.5 l. of 14 N nitric acid.

By using the same metal impurity-eluting solution and tantalum-eluting solution, and according to the same apparatus and operation, as in the case of Example 1, tantalum was recovered as tantalum pentoxide. The recovery of tantalum was 99.9%. Quantitative analysis on the resultant tantalum pentoxide was also performed in the same manner as in Example 1. The results are shown together in Table 1.

EXAMPLES 3 TO 6

Under the same conditions as in Example 1, except that the constitution of the metal impurity-eluting solution and the ammonium salt to be included in the tantalum-eluting solution were replaced by those as shown below, operation was carried out to recover tantalum. The results are shown together in Table 1.

| | Metal impurity-eluting solution | Ammonium salt in tantalum-eluting solution |
|---|---|---|
| Example 3 | HF (0.2 mol/l.) + HCl (2.5 mol/l.) | NH$_4$Cl 2.4 kg |
| Example 4 | HF (0.2 mol/l.) + HNO$_3$ (2.5 mol/l.) | NH$_4$NO$_3$ 2.4 kg |
| Example 5 | HF (0.2 mol/l.) + H$_2$SO$_4$ (2.5 mol/l.) | (NH$_4$)$_2$SO$_4$ 2.4 kg |
| Example 6 | HF (0.2 mol/l.) + HClO$_4$ (2.5 mol/l.) | NH$_4$ClO$_4$ 2.4 kg |

TABLE 1

| | Metallic element (ppm) | | | | | | | | | | Recovery of tantalum (%) |
|---|---|---|---|---|---|---|---|---|---|---|---|
| | Fe | Si | Cu | Ca | Nb | Al | Li | Mg | Ag | Mn | |
| Example 1 | 1 | 6 | <1 | 1 | 5 | 1 | 2 | <1 | — | — | 98.2 |
| Example 2 | 1 | <1 | <1 | <1 | 3 | <1 | — | <1 | 1 | <1 | 99.0 |
| Example 3 | <1 | 6 | <1 | 1 | 10 | 1 | 3 | 1 | — | — | 97.7 |
| Example 4 | 1 | 5 | 1 | 2 | 8 | 1 | 2 | <1 | — | — | 98.0 |
| Example 5 | 5 | 15 | 2 | 3 | 17 | 2 | 3 | 1 | — | — | 96.3 |
| Example 6 | 10 | 18 | 2 | 3 | 30 | 2 | 4 | 2 | — | — | 94.6 |

Error: Si ±3
Other elements ±2

EXPERIMENT 1

Relation between concentration of hydrofluoric acid and elution of metal impurities Concentration of hydrofluoric acid in the metal impurity-eluting solution used in Example 1 was made to vary as shown in Table 2 (Sample Nos. 1 to 10) to carry out the recovery of the tantalum pentoxides in the same manner as in Example 1 except that the contents of Al and Fe in the scrap were 2% and 8%, respectively. The products thus obtained were subjected to quantitative analyses to observe the elution characteristics of Si and Fe which are representative impurities contained therein. Results are shown together in Table 2.

The less Si and Fe contained in the recovered Ta$_2$O$_5$, the better. Especially, more than 200 ppm of Si should not be contained in the recovered products, which otherwise can not be suitable for their reuse, and less than 10 ppm of Si concentration is essential for reuse thereof as the materials for lithium tantalate. From these viewpoints, it was found that the concentration of HF in the eluting solution should range from 3 to 10 mol/l. and more preferably from 6 to 9 mol/l.

TABLE 2

| Sample No. | HF (mol/l.) | Purity of recovered Ta$_2$O$_5$ Si (ppm) | Purity of recovered Ta$_2$O$_5$ Fe (ppm) | Recovery (%) | Recovering cost* |
|---|---|---|---|---|---|
| 1 | 0.1 | >200 | 50 | >95 | A |
| 2 | 1.0 | " | 20 | " | B |
| 3 | 2.0 | " | 20 | " | C |
| 4 | 3.0 | 30 | <10 | " | C |
| 5 | 6.0 | 20 | " | " | D |
| 6 | 8.0 | 10 | " | " | D |
| 7 | 9.0 | <10 | " | " | D |
| 8 | 10.0 | " | " | " | D |
| 9 | 12.0 | " | " | " | E |
| 10 | 15.0 | " | " | " | E |

*Evaluation in terms of
A: very inexpensive
B: inexpensive
C: a little expensive
D: expensive
E: very expensive

EXPERIMENT 2

Relation between concentration of hydrofluoric acid+strong acid and elution of metal impurities Concentrations of hydrofluoric acid and hydrochloride acid, respectively, contained in the metal impurity-eluting solution used in Example 3 were made to vary as shown in Table 3 (Sample Nos. 1 to 43) to carry out the recovery of the tantalum pentoxides in the same manner as in Example 1 except that the contents of Al and Fe in the scrap were 2% and 8%, respectively. The products thus obtained were subjected to quantitative analyses to observe the elution characteristics of Si and Fe which are representative impurities contained therein. Results are shown together in Table 3.

The little Si and Fe are contained in the recovered Ta$_2$O$_5$, the better. Especially, more than 200 ppm of Si should not be contained in the recovered products, which otherwise can not be suitable for their reuse, and less than 10 ppm of Si concentration is essential for reuse thereof as the materials for lithium tantalate. In addition, too high concentration of HF in the eluting solution would result in an increase of the amount of the eluting solution necessary for obtaining the desired recovery of the products and also the cost for after-treatment of the waste liquor, thereby rendering a series of the operations very expensive as a whole. From these viewpoints, it was determined that the concentrations of HF and HCl in the eluting solution should range from 0.01 to 0.5 mol/l. and 1 to 6 mol/l. respectively, and more preferably from 0.1 to 0.3 mol/l. and 2 to 4 mol/l., respectively.

TABLE 3

| Sample No. | HF (mol/l.) | HCl (mol/l.) | Purity of recovered Ta$_2$O$_5$ Si (ppm) | Purity of recovered Ta$_2$O$_5$ Fe (ppm) | Recovery (%) | Recovering cost* |
|---|---|---|---|---|---|---|
| 1 | 0 | 1.0 | 80 | <10 | <80 | A |
| 2 | " | 4.0 | <10 | 50 | " | A |
| 3 | 0.01 | 0.5 | >150 | <10 | 95 | A |
| 4 | " | 1.0 | 90 | " | 90 | A |
| 5 | " | 2.0 | <10 | " | 85 | A |
| 6 | " | 4.0 | " | 30 | " | B |
| 7 | " | 6.0 | " | 50 | <85 | B |
| 8 | " | 8.0 | " | 100 | " | C |
| 9 | 0.05 | 1.0 | 110 | <10 | 90 | A |
| 10 | " | 2.0 | <10 | " | 85 | A |
| 11 | " | 4.0 | " | 30 | <85 | B |
| 12 | 0.1 | 0.5 | >200 | <10 | >95 | A |
| 13 | " | 1.0 | 120 | " | " | A |
| 14 | " | 2.0 | 20 | " | 95 | A |
| 15 | " | 2.5 | <10 | " | " | A |
| 16 | " | 3.0 | " | 20 | 90 | A |
| 17 | " | 4.0 | " | 30 | " | B |
| 18 | " | 6.0 | " | 100 | 85 | B |
| 19 | " | 8.0 | " | >200 | <85 | C |
| 20 | 0.2 | 0.5 | >200 | <10 | >95 | A |
| 21 | " | 1.0 | 140 | " | " | A |
| 22 | " | 2.5 | <10 | " | " | A |
| 23 | " | 3.0 | " | 20 | 90 | A |
| 24 | " | 4.0 | " | 30 | " | B |
| 25 | 0.3 | 1.0 | 150 | <10 | >95 | A |
| 26 | " | 2.0 | 50 | " | " | A |
| 27 | " | 4.0 | <10 | " | 95 | B |
| 28 | " | 6.0 | " | 100 | 90 | B |
| 29 | " | 8.0 | " | >200 | 85 | B |
| 30 | 0.5 | 0.5 | >200 | <10 | >95 | A |
| 31 | " | 1.0 | " | " | " | A |
| 32 | " | 2.0 | 180 | " | " | B |
| 33 | " | 4.0 | 80 | 30 | 90 | B |
| 34 | " | 6.0 | 40 | 100 | " | C |
| 35 | " | 8.0 | <10 | >200 | <85 | D |
| 36 | 0.7 | 1.0 | >200 | <10 | >95 | B |
| 37 | " | 2.0 | " | " | " | B |
| 38 | " | 4.0 | " | 30 | 90 | C |
| 39 | " | 6.0 | 200 | 100 | 85 | D |
| 40 | 1.0 | 1.0 | >200 | <10 | >95 | B |
| 41 | " | 2.0 | " | " | " | B |
| 42 | " | 4.0 | " | 25 | " | C |
| 43 | " | 8.0 | 120 | >200 | 85 | D |

*Evaluation in terms of
A: very inexpensive
B: inexpensive
C: a little expensive
D: expensive

We claim:

1. A method of recovering tantalum from tantalum-containing scrap containing at least silicon and niobium as impurities to produce a recovered tantalum product containing less than about 200 ppm of silicon, consisting essentially of the steps of:

dissolving in an inorganic acid a tantalum scrap containing at least silicon and niobium to form a solution;

contacting said solution with an anionic exchange resin;

first washing said contacted exchange resin with (a) a solution of about 3 to 10 mol/l of hydrofluoric acid or (b) a solution of a strongly acidic medium comprising from about 0.01 to 0.5 mol/l of hydrofluoric acid and from about 1 to 6 mol/l of a strong acid to remove the impurities;

further washing said exchange resin with an aqueous solution of a mixture comprising hydrofluoric acid, aqueous ammonia and an ammonium salt to produce a tantalum eluate; and recovering tantalum from the tantalum eluate.

2. A method according to claim 1, wherein said anionic exchange resin is of strongly basic quarternary ammonium type or strongly basic piridinium type.

3. A method according to claim 1, wherein said strongly acidic medium includes at least one strong acid selected from the group consisting of hydrochloric acid, nitric acid, sulfuric acid and perchloric acid.

4. A method according to claim 1, wherein the concentration of said hydrofluoric acid in the solution (a) ranges from 6 to 9 mol/l.

5. A method according to claim 1, wherein the concentration of hydrofluoric acid contained in the solution (b) of strongly acidic medium containing hydrofluoric acid ranges from 0.1 to 0.3 mol/l. and the concentration of strong acid contained therein ranges from 2 to 4 mol/l.

6. A method according to claim 1, wherein said ammonium salt is selected from the group consisting of ammonium chloride, ammonium nitrate, ammonium sulfate and ammonium perchlorate.

7. A method according to claim 1, wherein the pH of said solution of the mixture comprising hydrofluoric acid, aqueous ammonia and ammonium salt ranges from 3 to 6.

8. A method according to claim 1, wherein the pH of said solution of the mixture comprising hydrofluoric acid, aqueous ammonia and ammonium salt ranges from 5 to 6, 3 to 4, 2 to 4, or 3 to 5 in the case where said ammonium salt therein is ammonium chloride, ammonium nitrate, ammonium sulfate or ammonium perchlorate, respectively.

9. A method of recovering tantalum from silicon-containing tantalum as defined in claim 1, wherein said recovery step comprises recovering tantalum pentaoxide by precipitation and subsequent dehydration of the precipitate.

10. A method according to claim 9, wherein said recovering step comprises:
    adjusting the pH of said tantalum eluate to precipitate tantalum hydroxide; and
    dehydrating said tantalum hydroxide to obtain said tantalum pentoxide.

11. A method according to claim 10, wherein said pH is adjusted to a value of at least about 6.

12. A method according to claim 11, wherein adjusting the pH comprises adding aqueous ammonia.

13. A method according to claim 1, wherein there is produced a recovered tantalum product containing less than about 10 ppm of silicon and wherein the concentration of said hydrofluoric acid in the solution (a) ranges from 6 to 9 mol/l.

14. A method according to claim 1, wherein there is produced a recovered tantalum product containing less than about 10 ppm of silicon and wherein the concentration of hydrofluoric acid contained in the solution (b) of strongly acidic medium containing hydrofluoric acid ranges from 0.1 to 0.3 mol/l and the concentration of strong acid contained therein ranges from 2 to 4 mol/l.

* * * * *